US008045714B2

(12) United States Patent
Cross et al.

(10) Patent No.: US 8,045,714 B2
(45) Date of Patent: Oct. 25, 2011

(54) SYSTEMS AND METHODS FOR MANAGING MULTIPLE KEYS FOR FILE ENCRYPTION AND DECRYPTION

(75) Inventors: David B. Cross, Redmond, WA (US); Duncan G. Bryce, Issaquah, WA (US); Jianrong Gu, Bellevue, WA (US); Kelvin Shek Yiu, Seattle, WA (US); Monica Ioana Ene-Pietrosanu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 11/053,212

(22) Filed: Feb. 7, 2005

(65) Prior Publication Data

US 2006/0179309 A1 Aug. 10, 2006

(51) Int. Cl.
*H04L 9/00* (2006.01)
(52) U.S. Cl. ............ 380/277; 380/44; 380/45; 380/278; 380/281; 713/153; 713/155; 713/165; 713/168; 713/193
(58) Field of Classification Search .................. 380/277, 380/44, 45, 278, 281; 713/155, 153, 165, 713/168, 193
See application file for complete search history.

(56) References Cited

U.S. PATENT DOCUMENTS

| | | | | | |
|---|---|---|---|---|---|
| 5,495,533 | A | * | 2/1996 | Linehan et al. | 713/155 |
| 5,787,175 | A | * | 7/1998 | Carter | 713/165 |
| 5,940,507 | A | * | 8/1999 | Cane et al. | 713/165 |
| 6,134,660 | A | * | 10/2000 | Boneh et al. | 713/193 |
| 6,157,722 | A | * | 12/2000 | Lerner et al. | 380/260 |
| 6,249,866 | B1 | * | 6/2001 | Brundrett et al. | 713/165 |
| 6,830,182 | B2 | * | 12/2004 | Izuyama | 235/449 |
| 6,981,138 | B2 | * | 12/2005 | Douceur et al. | 713/153 |
| 7,065,215 | B2 | * | 6/2006 | Shirakawa et al. | 380/277 |
| 7,178,021 | B1 | * | 2/2007 | Hanna et al. | 713/155 |
| 7,203,317 | B2 | * | 4/2007 | Kallahalla et al. | 380/278 |
| 2001/0056541 | A1 | * | 12/2001 | Matsuzaki et al. | 713/193 |
| 2002/0051536 | A1 | | 5/2002 | Shirakawa et al. | |
| 2004/0151310 | A1 | | 8/2004 | Fu et al. | 380/44 |

(Continued)

FOREIGN PATENT DOCUMENTS

EP 0 912 011 4/1999

(Continued)

OTHER PUBLICATIONS

Eckert et al. "GSFS- A New Group-Aware Cryptographic File System." Information Secruity for Global Information Infrastructures, IFTP TC11, Annual Working Conference on Information Secruity, Proceedings of Security, Aug. 22, 2000.*

(Continued)

*Primary Examiner* — Edan Orgad
*Assistant Examiner* — Kari Schmidt
(74) *Attorney, Agent, or Firm* — Woodcock Washburn LLP

(57) ABSTRACT

Systems and methods for managing multiple keys for file encryption and decryption may provide an encrypted list of previously used keys. The list itself may be encrypted using a current key. To decrypt files that are encrypted in one or more of the previous keys, the list can be decrypted, and the appropriate previous key can be retrieved. To re-key files, an automated process can decrypt any files using previous keys and encrypt them using the current key. If a new current key is introduced, the prior current key can be used to decrypt the list of keys, the prior current key can be added to the list, and the list can be re-encrypted using the new current key.

18 Claims, 12 Drawing Sheets

= Data Encrypted Using Using First Key

= Data Encrypted Using Using Previous Key 703

U.S. PATENT DOCUMENTS

| | | | |
|---|---|---|---|
| 2005/0235163 A1* | 10/2005 | Forlenza et al. | 713/193 |
| 2006/0018484 A1* | 1/2006 | Yoshihiro et al. | 380/277 |
| 2007/0217613 A1* | 9/2007 | Lam et al. | 380/277 |

FOREIGN PATENT DOCUMENTS

| | | |
|---|---|---|
| WO | WO 99/14652 A | 3/1999 |
| WO | WO 02/29577 | 4/2002 |

OTHER PUBLICATIONS

Eckert, C. et al, "GSFS—A New Group-Aware Cryptographic File System," Information Security for Global Information Infrastructures, IFIP TC11, Annual Working Conference on Information Security, Proceedings of Security, Aug. 22, 2000, 221-230.

Menezes et al., *Handbook of Applied Cryptography: Key Management Techniques*, CRC Press Series on Discrete Mathematices and its Applications, Boca Raton, FL, 1997, 13, 541-588.

U.S. Appl. No. 10/351,683, filed Feb. 27, 2003, Cross et al.

"Encrypting File System in Windows XP and Windows Server 2003," *Microsoft TechNet*, Aug. 1, 2002, http://www.microsoft.com/technet/prodtechnol/winxppro/deploy/cryptfs.mspx?pf=true.

"Windows Data Protection," *NAI labs, Network Associates, Inc.*, Oct. 2001, msdn.microsoft.com/library/default.asp?url=library/en-us/dnsecure/html/windataprotection-dpapi.asp.

\* cited by examiner

SYSTEMS AND METHODS FOR MANAGING MULTIPLE KEYS FOR FILE ENCRYPTION AND DECRYPTION

FIELD OF THE INVENTION

This invention relates to computing, and more particularly to encryption of data, where multiple keys may be used to encrypt data stored across one or more computing devices.

BACKGROUND OF THE INVENTION

File encryption is increasingly a method of choice in securing data. Operating systems may even offer automated file encryption in the form of an Encrypted File System (EFS). Regardless of the setting in which file encryption is used, it is likely that over time files may be encrypted according to more than one key. A plurality of first files may be encrypted according to a first key, while a plurality of second files are encrypted to a second key, any number of previous files are encrypted using previous keys.

To use the case of an EFS as an example, an operating system may encrypt files according to keys available from smartcards, for example. If a user has encrypted many files on many servers using a smartcard, when the user changes the current key, the old files will still be encrypted to the old smart card and the user must manually re-key all of them. While automated processes may be implemented to re-key at the time of the card switch, such processes may take time and resources to complete, and moreover, if the user is not very knowledgeable, she may have missed the re-key prompt. Now whenever the user opens a file encrypted with the old smart card, she must unplug her current smart card and plug in the old one. If she lost the old card, she must recover her data using an EFS recovery agent or totally lose access to the files. The problem is compounded for users who have gone through a number of smartcards for use with a particular EFS.

Thus, in the context of an EFS or otherwise, it is desirable to provide long term access to files that were encrypted using multiple encryption keys without changing the previously used encryption keys, but providing access through one current cryptographic key. A mechanism to re-key all encrypted files over time without requiring user intervention is also advantageous to improve the usability and prevent data loss through loss and destruction of the previous encryption keys.

SUMMARY OF THE INVENTION

In consideration of the above-identified shortcomings of the art, the present invention provides systems and methods for managing multiple keys for file encryption and decryption. In general, a list of previously used keys may be encrypted using a key, which is referred to herein as a "current key." Access to the list of keys is thus restricted to those possessing the current key. To decrypt files that are encrypted in one or more of the previous keys, the list can be decrypted, and the appropriate previous key can be retrieved. To migrate files from a state of encryption in a previous key to a state of encryption in the current key, referred to as re-keying, an automated process can decrypt any files and/or decryption keys used to encrypt such files, using the previous key(s) under which the files/keys were encrypted, and encrypt the files/keys using the current key. The automated process can operate as computing resources are available to minimize delay to a user who may meanwhile conduct higher-priority computing operations. If a new current key is introduced, the prior current key can be used to decrypt the list of keys, the prior current key can be added to the list, and the list can be re-encrypted using the new current key. Other advantages and features of the invention are described below.

BRIEF DESCRIPTION OF THE DRAWINGS

The systems and methods for managing multiple keys for file encryption and decryption in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
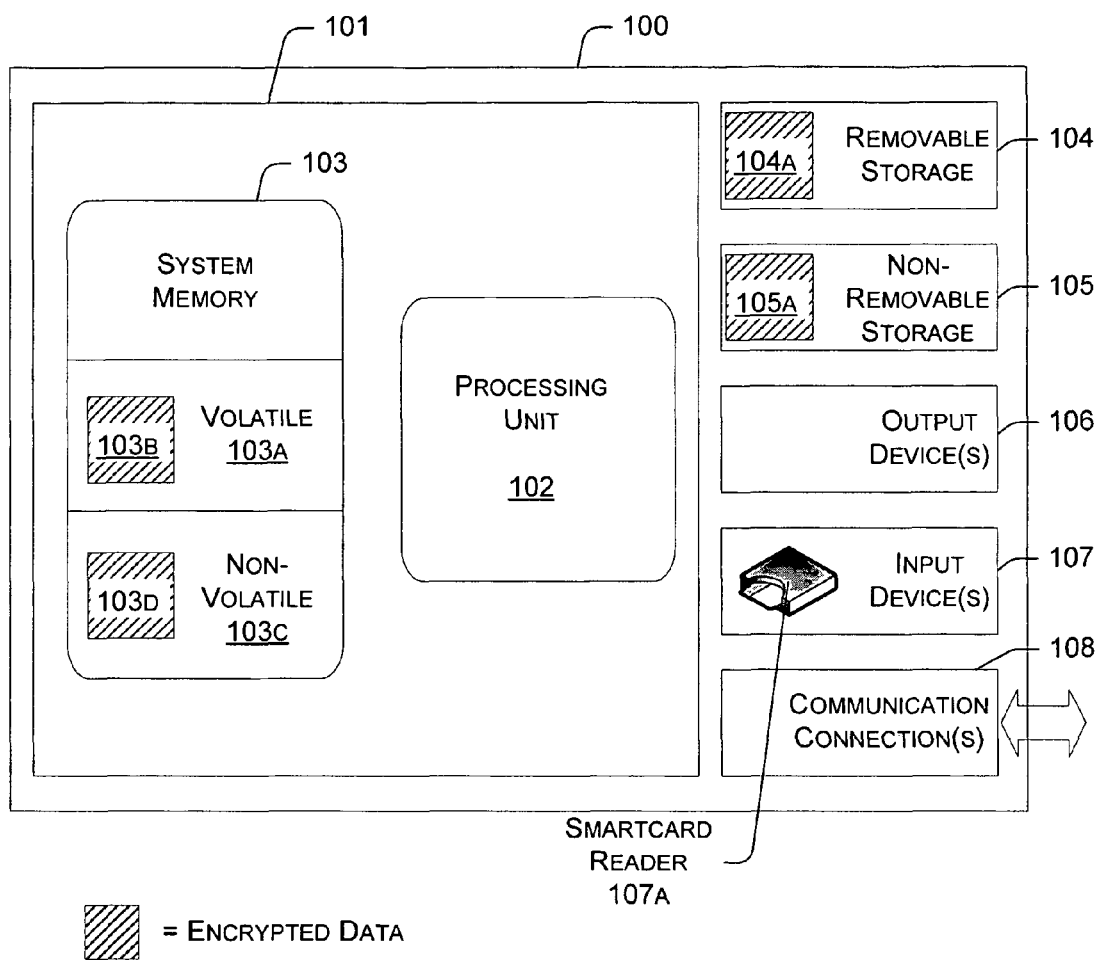
FIG. 1 is a block diagram broadly representing the basic features of an exemplary computing device suitable for use in conjunction with various aspects of the invention. The computing device may comprise encrypted data 103B, 103D, 104A, 105A. Access to such data may require one or more decryption keys that can be managed according to the techniques described herein.

FIG. 1 is a block diagram broadly representing the basic features of an exemplary computing device 100 suitable for use in conjunction with various aspects of the invention. With reference to FIG. 1, an exemplary system for implementing the invention includes a computing device, such as device 100. In its most basic configuration, device 100 typically includes a processing unit 102 and memory 103. Depending on the exact configuration and type of computing device, memory 103 may be volatile 103A (such as RAM), non-volatile 103C (such as ROM, flash memory, etc.) or some combination of the two. Additionally, device 100 may also have mass storage (removable 104 and/or non-removable 105) such as magnetic or optical disks or tape. In any such memory locations 103A, 103B, 104, 105, or in locations accessible to device 100 across communication connection(s) 108, encrypted data 103B, 103D, 104A, 105A may be found. Encrypted data is reversibly scrambled according to some algorithm, so that the data can be unscrambled if a decryption key is known.

Device 100 may also have input devices 107 such as smart card reader 107A and/or output devices 106 such as a display, a printer, and the like. Other aspects of device 100 may include communication connections 108 to other devices, computers, networks, servers, etc. using either wired or wireless media. All these devices are well known in the art and need not be discussed at length here.

For device 100 to decrypt encrypted data 103B, 103D, 104A, 105A, one or more keys (not shown) are needed. Decryption keys are any information that can be used to decipher encrypted data. Such keys may themselves be digitally stored information available from some form of computer memory, e.g., from non-volatile system memory 103c. Decryption keys may also be available from a wide variety of other sources, including but not limited to smart cards that may be introduced to a smartcard reader 107A. When a key is stored on a smartcard, the card can be introduced to the reader 107A, the key can be retrieved from the card by the computing device 100, and the key can be used to decrypt data, e.g., 103B.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
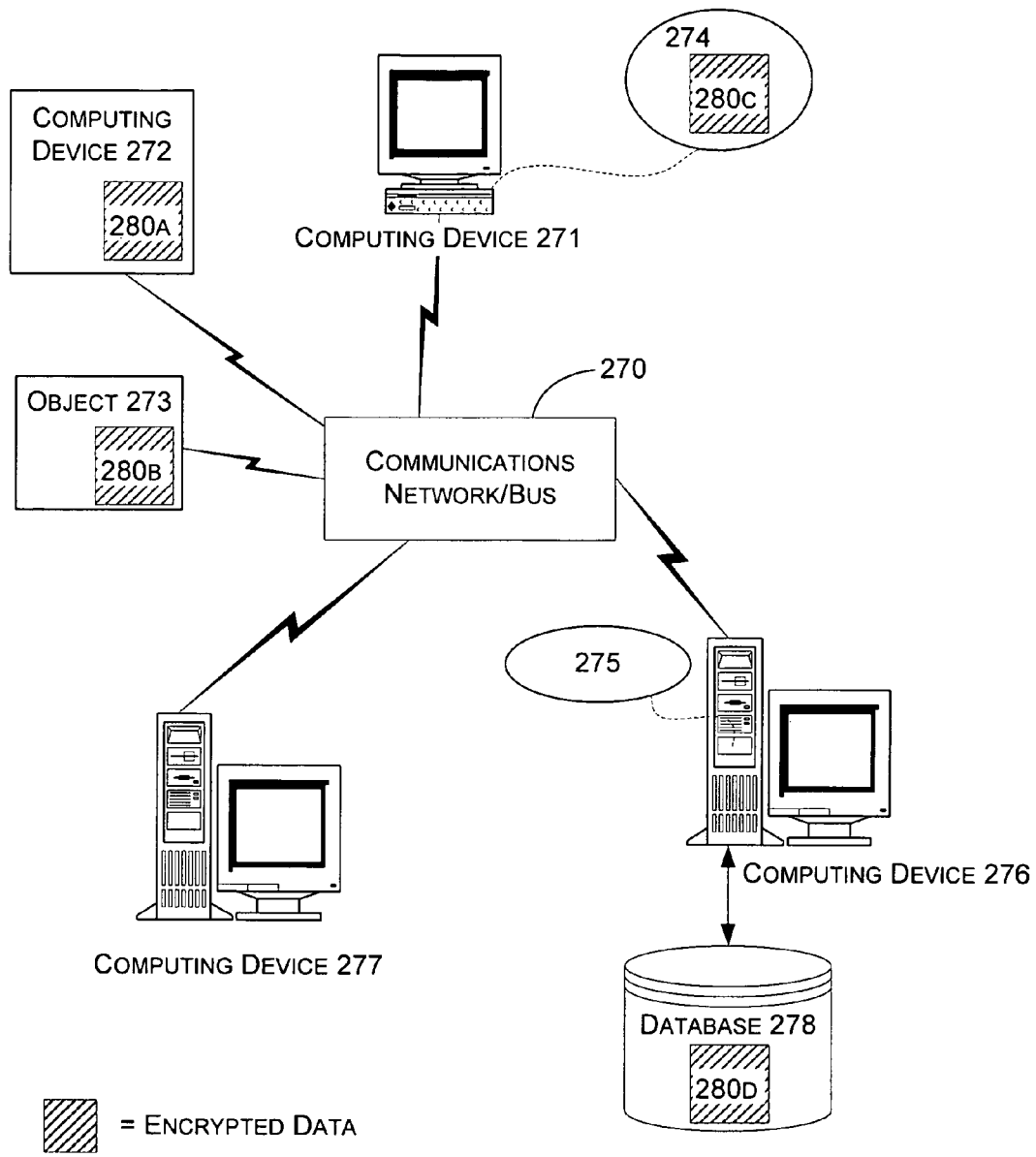
FIG. 2 illustrates an exemplary prior art networked computing environment in which computerized processes, including those of the invention, may be implemented. The networked computing devices may store exemplary encrypted data 280A, 280B, 280C, 280D. Access to such data may require one or more decryption keys that can be managed according to the techniques described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, encrypted data shown in exemplary locations 280A, 280B, 280C, and 280D may reside at any entity in the network. The encrypted data 280A, 280B, 280C, and 280D may be accessed, re-keyed, and otherwise used by any of the various devices in implementing the systems and methods of the invention.

There are a variety of systems, components, and network configurations that support networked computing environments. For example, computing systems may be connected together by wired or wireless systems, by local networks or widely distributed networks. Currently, many networks are coupled to the Internet. Any such networks, whether coupled to the Internet or not, may be used in conjunction with the systems and methods provided.

A network infrastructure may enable a host of network topologies such as client/server, peer-to-peer, or hybrid architectures. A "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) may communicate with one another utilizing the functionality provided by protocol layer(s). Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

As will become clear with the description of the invention below, various embodiments of the invention may comprise a networked client device, such as, for example, computing device 277. The client 277 may be a personal computer that is primarily operated by a single person. The person may use client 277 to communicate with and store encrypted data in a plurality of locations, e.g., 280A, 280D. Computing device 272 may be, for example, a server on which the person may keep encrypted files, so that the files are accessible remotely. Modern computing increasingly involves storing data, for example email and other personal data, databases, files, and company and corporate information in a networked environment that is accessible from many places on a network. A list of keys may be maintained at the personal device 277, and processes running on personal device 277 may manage the list as well as processes for rekeying encrypted data that resides either on personal device 277, on server 272, or on any other device in the network.

In light of the diverse computing environments that may be built according to the general framework of provided in FIG. 2, the systems and methods provided herein cannot be construed as limited in any way to a particular computing architecture. Instead, the present invention should not be limited to any single embodiment, but rather should be construed in breadth and scope in accordance with the appended claims.

The systems and methods of the invention are operable in any scenarios in which data is encrypted according to multiple keys, and one such scenario can occur in computer systems that make use of an EFS. In particular, an EFS may encrypt files under one or more keys, and the desired keys for use with the system may change over time. When such change occurs, it is necessary to retain the previous keys for continued access to files that are encrypted using the previous keys. Various embodiments provide useful systems and methods for retaining, managing, and accessing such previous keys in a secure manner, as well as re-keying encrypted files to obviate the need for the previous keys.

An EFS is known in the art, and is embodied in recent MICROSOFT WINDOWS® operating systems. An embodiment of such an EFS is described in U.S. Pat. No. 6,249,866, which issued on Jun. 19, 2001 to Brundrett et al. with the title "Encrypting File System and Method." An EFS is any automated system whereby files are automatically encrypted when stored in long-term memory, and automatically decrypted as they are needed by an authorized user. Various implementations of an EFS can provide a user authentication process through which the user proves he is authorized to access encrypted files. Any number of keys may then be created on behalf of the user to encrypt and/or decrypt files which the user may wish to secure.

While the invention is operable with any type of EFS, a description of the MICROSOFT® EFS is provided for a general discussion of EFS features that may be used in conjunction with the invention. The MICROSOFT® EFS uses public-key cryptography in order to secure files. This means that both a public key and private key exist for the purpose of encryption and decryption. However, what the public key encrypts is not the files themselves. Instead, every file is encrypted with a symmetric key, called a FEK (file encryption key), and this FEK is stored in the header of the encrypted file, in a field called the Data Decryption Field (DDF). The FEK is not left open and exposed, however. It is encrypted with the user's public key. When the user wants to open a file, their private key is used to decrypt the FEK, and then the FEK is used to decrypt the file. The beauty of this arrangement is that even if a hacker were able to decrypt the FEK, they still only get into a single file, since most files have different FEKs.

Figure 3:
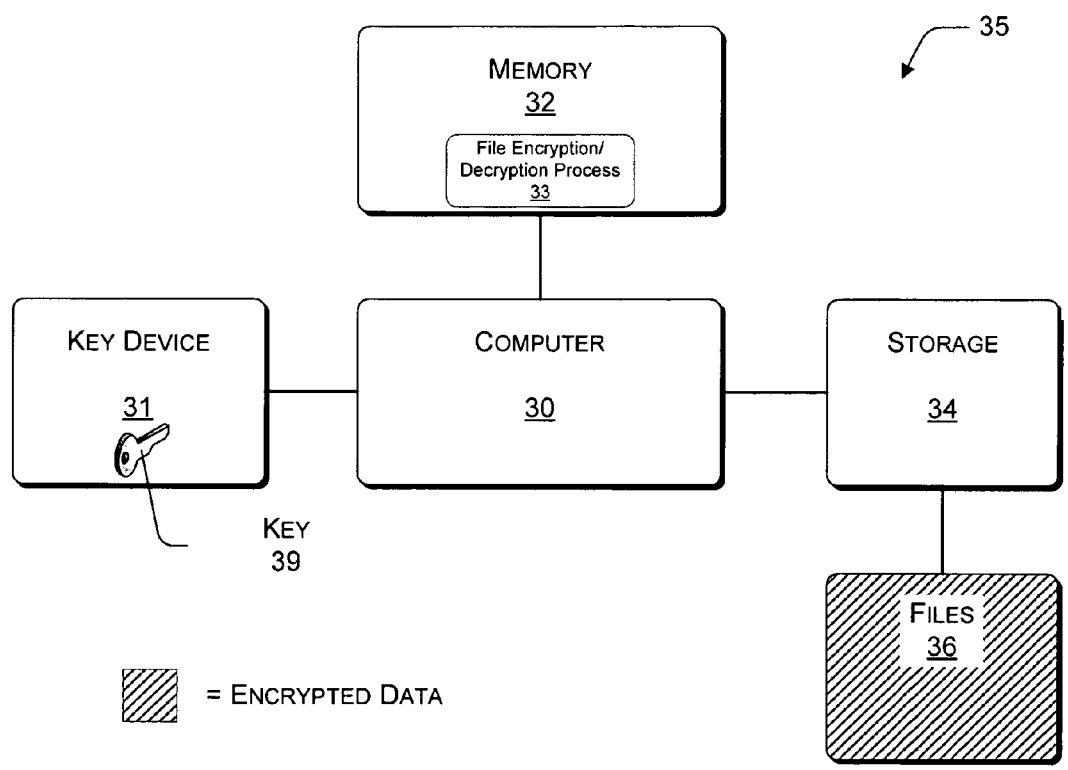
FIG. 3 illustrates an exemplary encrypting file system (EFS) which may use encryption keys to encrypt and decrypt files. A key 39 may be retrieved from a location such as the exemplary key device 31 A process 33 may use the key 39 or keys derived therefrom to decrypt files 36 in any of a variety of storage 34 locations.

FIG. 3 illustrates an exemplary encrypting file system (EFS) 35. In FIG. 3, a key 39 may be retrieved from a location such as the exemplary key device 32. A process 33 may use the key 39 or keys derived therefrom to decrypt files 36 in any of a variety of storage 34 locations. Computer 30 may be a general-purpose computer system, or another computing device as described with reference to FIG. 1.

An EFS 35 may derive a symmetric master key from an asymmetric key for the purpose of file encryption. The symmetric master key may be derived for example, from an asymmetric key 39 that is introduced to key device 31. The use of a symmetric master key provides certain advantages. For example, first, such a symmetric key can be reused without requiring continual access to the original asymmetric key pair stored on the key device. Key cache nodes may be used in some embodiments of an EFS to store the symmetric master key in the computer memory or memory devices. Two types of key cache nodes relating to the key device 31 are the symmetric master key type cache and the Pin\CardState type cache. Once, the symmetric master key type cache is established, it is not required that the key device be activated (e.g., the smartcard be inserted in the reader) for the EFS to encrypt/decrypt files. The symmetric master key type cache, as determined by system parameters, could be valid even after workstation lock, but can be invalid or disabled for a specific user after use logoff. In contrast, the Pin\CardState type cache can be invalid as soon as a card is removed from the reader.

Second, a symmetric master key may be much faster at encrypting and decrypting than an asymmetric key. Finally, yet another exemplary benefit of embodiments of an EFS 35 in which a symmetric master key is used is that the user may gain some portability in accessing the EFS 35 remotely. The files which are encrypted or decrypted end-to-end with the FEK, when downloaded from remote servers and accessed by client systems, will require the decryption process on the client systems. The symmetric master key can be derived or retrieved from the computer memory on any client system in which the key device is made available. Once the symmetric master key is derived or made available, the encrypted or decrypted files may be downloaded from multiple remote servers without additional processing on the client system to discover the decryption key.

In some EFS's every user's symmetric master key may be unique. Only the user himself may derive his symmetric master key. Other individuals may be barred from deriving the user's master key by virtue of not possessing the user's private key. The symmetric master key is derived at least once from an asymmetric key that can be retrieved from the key device 31. The symmetric master key can then be used to encrypt a randomly generated file encrypting key (FEK).

The asymmetric key pair can be stored, for example, in the key device 31. The symmetric master key may then be derived from the private key of the asymmetric key pair. Alternately, the symmetric master key could be derived using both keys of the asymmetric key pair. Once the symmetric master key is stored in the memory 32, in one embodiment, the symmetric master keys may be encrypted using the session keys for the general purpose computer or operating system on a per-boot basis.

The key device 31 may be, in different embodiments, a smartcard, a hardware security module, a token, a hard disk, or another such device that can be configured to securely store the private key of the asymmetric key pair. The key device 31 can be considered as a general-purpose device that stores the private key of the asymmetric key pair. As such, the key device may be structured as a peripheral device to the computer 30. Alternatively, the key device 31 can be integrated within the computer 30 itself, such as part of a processor chip or other chip, or as a chip containing only the private key of the asymmetric key pair or the asymmetric key pair, such as an application specific integrated circuit (ASIC), that is actually glued or otherwise secured onto a motherboard of the computer 30. As such, in some instances the chip can be actually contained within the general-purpose computer, and on the motherboard. If there is no hardware device storing the private key of the asymmetric key pair, it could also be stored in software, such as stored on a hard disk. As such, the key device should be considered very generic.

The EFS 35 can use a variety of different embodiments and algorithms to derive the symmetric master key from the private key of the asymmetric key pair. The RSA cryptographic algorithm is a well-known and accepted cryptographic algorithm. RSA is used primarily for public key cryptography. Other algorithms like DES (Data Encryption Standard), Triple DES, AES (Advanced Encryption Standard), etc. are used to encrypt and decrypt data files using the FEK that is encrypted using the symmetric master key.

In some embodiments, the list of keys contemplated herein may be a list of symmetric master keys—a "master key history." When a new asymmetric key is introduced, the previous symmetric master key may be added to the list, and the new master key—the master key derived from the new asymmetric key, may be used to encrypt the list. Other embodiments may place other EFS keys, such as the asymmetric public/private key pair and/or FEKs in a list of keys as provided herein.

In the case where master key is permitted, it is possible to store the key safely since the master key is a software symmetric key. Thus EFS systems that use master keys are particularly suited to the key management techniques provided herein. In contrast, it may not be necessary in many embodiments to archive software RSA keys (or the master key they generate), since the RSA key pair will continue to reside in the Cryptographic Service Provider (CSP). A "master key history" feature, as embodiments of the invention may be described, can be used to protect any type of key, software based, hardware based, or otherwise. One such key is a master key derived from a hardware RSA private key.

A unique aspect of the Master Key History is that it can enable the use of non certificate (x.509, XrML, etc) based asymmetric key pairs to also be used with Encrypted File Systems and have those stored, managed and used by the system while only allowing access through one asymmetric key based on a certificate. The symmetric keys may be wrapped using the current certificated public key and decrypted using the corresponding asymmetric private key. This increases the usability and overall diversification of keys of the system.

In summary, with reference to FIG. 3, the invention can be used to manage keys in conjunction with an EFS 35. Any EFS may use the techniques described herein. An exemplary EFS is that used by MICROSOFT® WINDOWS®. Some versions of the MICROSOFT® EFS derive a symmetric master key from an asymmetric key pair. The symmetric master key encrypts one or more FEKs. As such, when keys are described herein as encrypting or decrypting files, it is understood that this may actually entail encrypting and decrypting an FEK, which is in turn used to encrypt or decrypt a particular file. The invention may be used to manage any and all keys in this process.

Figure 4:
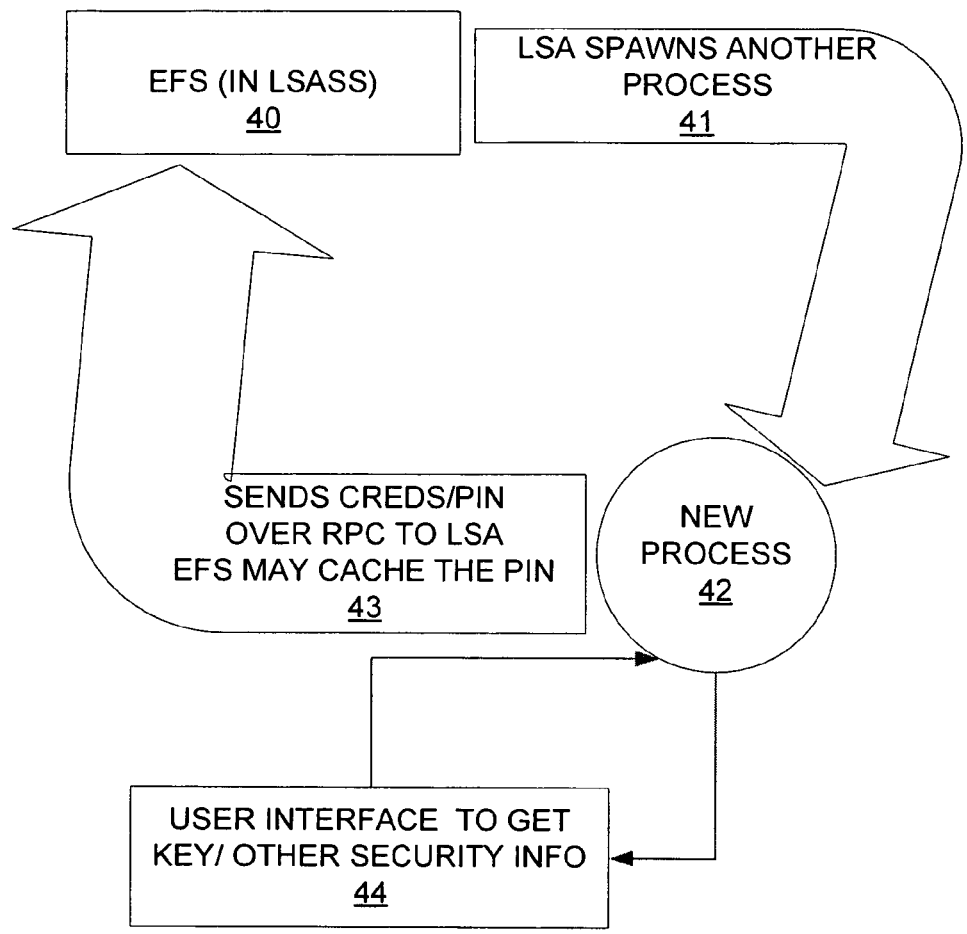
FIG. 4 illustrates exemplary systems and methods for retrieving a key, such as a personal identification number (PIN) from a key device such as a smart card. When an incoming command requiring a key arrives at a local security authority security service (LSASS) EFS 40, the LSASS EFS 40 can spawn a process 41, referred to as new process 42, which generates a user interface 44 that prompts a user for a key. The key can be sent back to the LSASS EFS for accessing they key stored on a smartcard portable device for use in encryption/decryption as necessary.

FIG. 4 illustrates exemplary systems and methods for retrieving a key, such as a personal identification number (PIN) in order to access a key device such as a smart card from an internal service which is not allowed to have direct interaction with the user (or raise user interface on the screen, however you want to say it best). When an incoming command requiring a key arrives at a local security authority security service (LSASS) EFS 40, the LSASS EFS 40 can spawn a process 41, referred to as new process 42, which generates a user interface 44 that prompts a user for a key. The key can be sent back to the LSASS EFS for use in encryption/decryption as necessary.

The process illustrated in FIG. 4 ensures that an EFS has all the Personal Identification Numbers (PINs) necessary to update a list of keys entries when master keys based on hardware based private keys on smartcards are used. For this scenario, an EFS system may harvest PINs for multiple smartcards through the illustrated process. Typically, LSASS is a system service that cannot directly interact with the user. Therefore, the EFS 40 may spawn 41 a separate process 42 that collects one or more PINs, for example by presenting a user interface 44 that prompts a user to enter the appropriate PINs. The process 42 can then send 43 the PINs back to LSA in a secure manner. EFS may then cache the PIN for a specified period of time, as illustrated in 43. This PIN will be used for accessing the private key on the smartcard to decrypt the encrypted files.

Other embodiments of FIG. 4 will be appreciated by those of skill in the art. For example, another way to accomplish the operation illustrated in FIG. 4 is for a client application that accesses an encrypted file to query EFS to determine if a PIN prompt is necessary. If so, the application prompts for the PIN and sends it to LSASS. This allows for modal prompting, which makes it clearer to the user that they are being prompted for a PIN.

Figure 5:
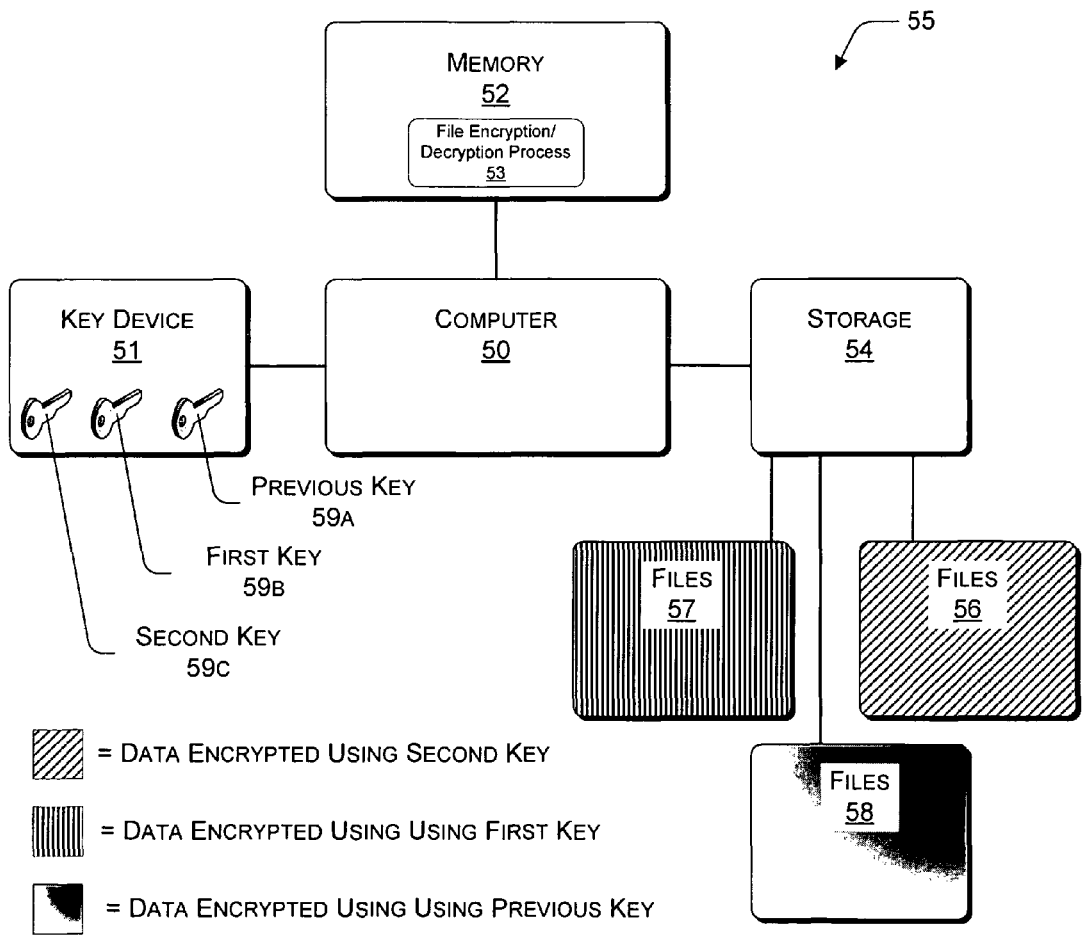
FIG. 5 illustrates an embodiment of the problem that is addressed by various advantages of the invention. When a key, e.g., first key 59B in an EFS 55 is changed, decryption of some files 57 may require previously used keys 59A, while decryption of other files such as those stored in 58 may require first key 59B. In any event, the new key, e.g., second key 59C, cannot be used alone to decrypt files 57 and 58. Accordingly, techniques are desired for providing efficient and seamless continued access to files 57 and 58 using second key 59C, as well as for re-encrypting files 57 and 58 using the second key 59C.

FIG. 5 illustrates an embodiment of the problem that is addressed by various advantages of the invention. When a key, e.g., first key 59B in an EFS 55 is changed, decryption of some files 57 may require previously used keys 59A, while decryption of other files such as those stored in 58 may require first key 59A. In any event, the new key, e.g., second key 59C, cannot be used to decrypt files 57 and 58. Accordingly, techniques are desired for providing efficient and seamless continued access to files 57 and 58 using second key 59C, as well as for re-encrypting files 57 and 58 using the second key 59C.

Consider the case where a user encrypted many files on many servers using a key stored on a smartcard. When the user changes the current key (the key currently by an EFS), all of the old files will still be encrypted to the old smart card key and the user must either manually re-key all his files, using, for example, a re-key wizard application capable of performing such a task, or, if the user is not very knowledgeable he may even resort to unplugging his current smart card and plugging in the old smartcard. If he loses the old card, he must recover his data using a recovery application, such as the recovery agent provided by the MICROSOFT® EFS. The problem is compounded for users who go through a number of smartcards to supply keys to an EFS.

To alleviate the problem presented in FIG. 5, a key list, or key history feature may be implemented to securely store the various decryption keys that a user goes through over time. Note that while the problem is illustrated in the context of an EFS, the invention can be used to manage decryption keys in any setting. When used with an EFS, embodiments of the invention may include a configuration setting on the computer 50, such as through a registry key, that turns an automated process for keeping track of decryption keys on or off. This policy disables or enables an EFS client from automatically maintaining an encrypted list of previously encrypted files when a re-key operation is performed. Where the feature is provided with an operating system, it can be ON by default.

Figure 6:
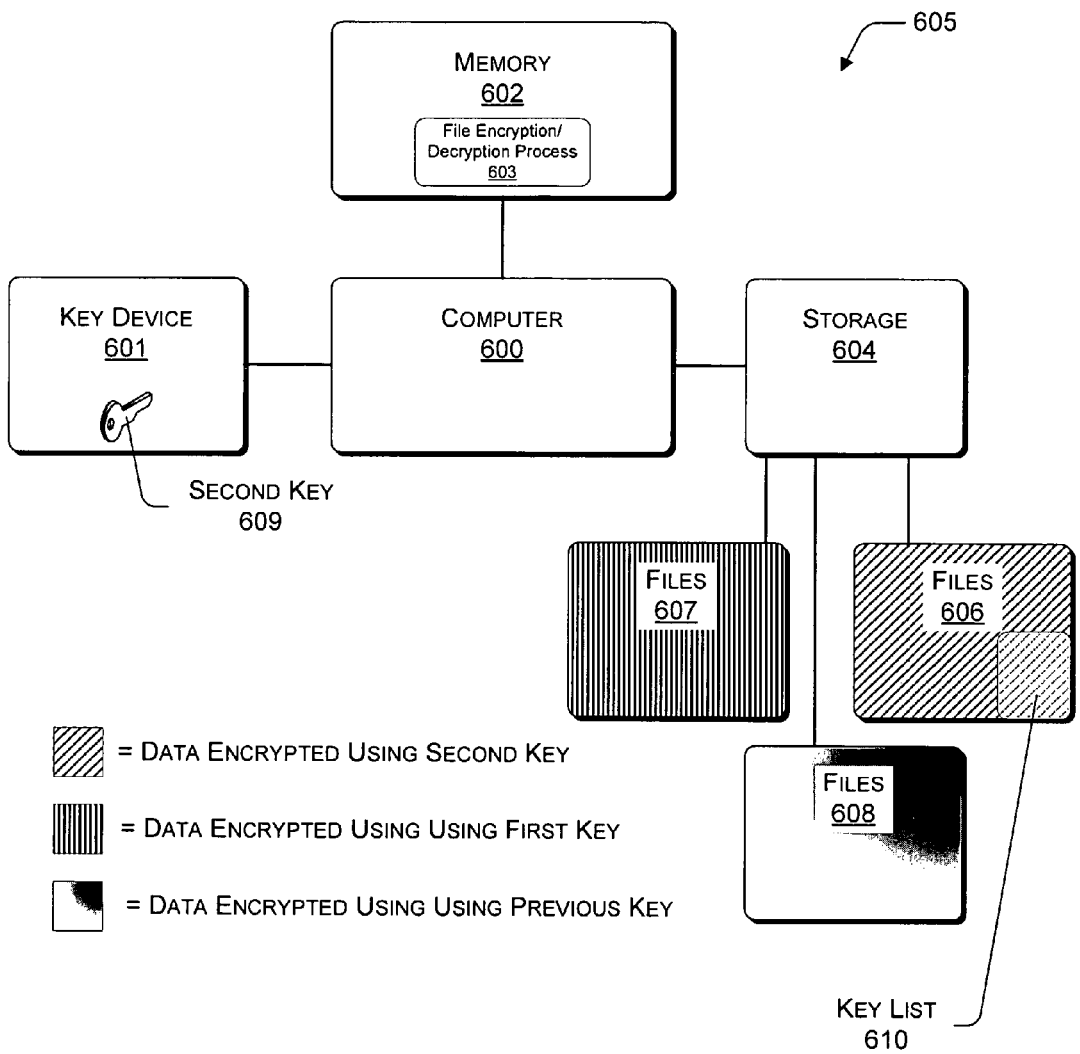
FIG. 6 illustrates a key list 610 that can be stored among encrypted files, e.g., files 606. The properties of a key list 610 are illustrated in FIG. 7.

FIG. 6 illustrates such a key list 610. The key list 610 can be stored among encrypted files, e.g., files 606. In the illustrated embodiment, an EFS 605 may maintain a history of all keys, e.g., all symmetric master keys in the MICROSOFT® EFS, where such master keys are enabled by policy. In such embodiments, it is possible to store the list 610 safely since the master key is a software symmetric key. In addition to securely storing previous keys, the key list 610 feature can guard against lost or corrupt software RSA keys. Also note that this feature may provide some benefit in storing a backup of encryption keys and as a recovery mechanism.

A key list 610 used on a computer 600 for a certain user may be stored as part of a user profile. For example, the keys to decrypt files 606 may correspond to a particular user profile. The key list 610 can be stored as a file, as a binary large object (BLOB) structure in the registry, or on a portable device such as a USB drive or a smartcard. In the MICROSOFT WINDOWS® operating system, an exemplary registry location for a binary BLOB structure containing a key list is:
HKCU\Software\Microsoft\Windows NT\CurrentVersion\EFS\CurrentKeys\MasterKeyHistory A new registry value, called, for example, EncryptionKeyHash, may be added under the MasterKeyHistory registry. This registry value may contain a hash of a certificate used to encrypt the key list 610.

Figure 7:
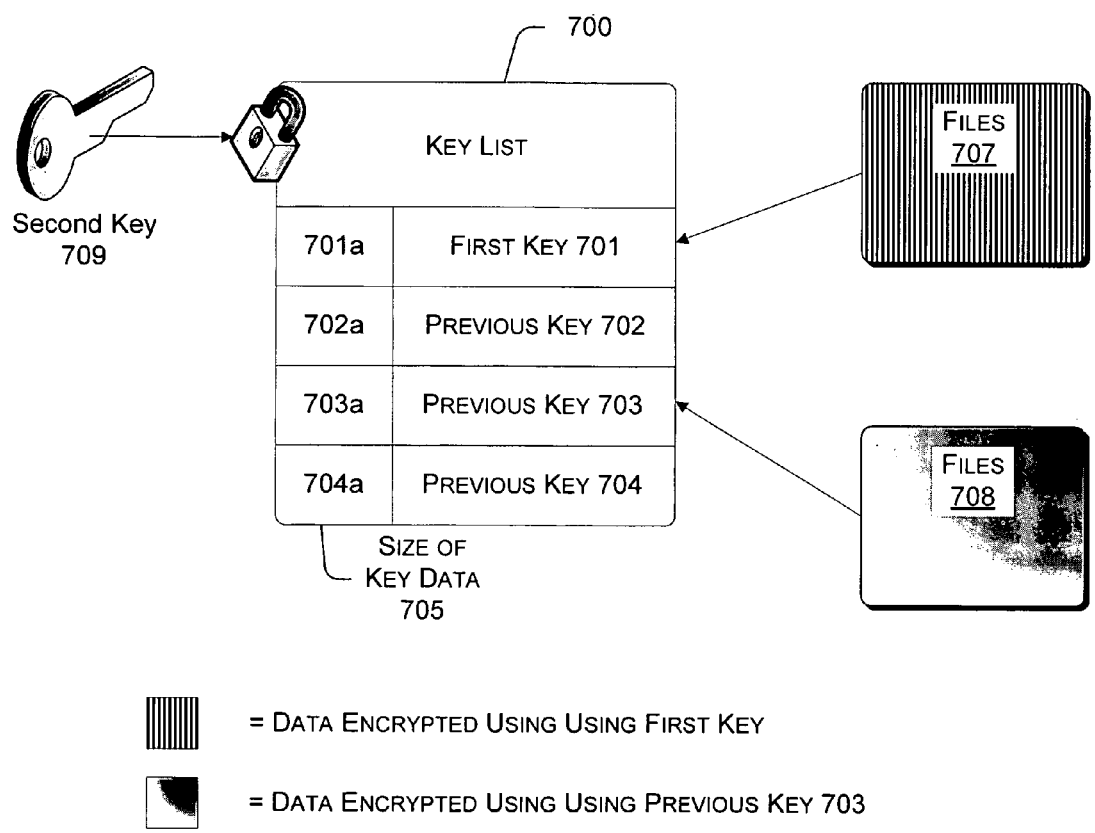
FIG. 7 illustrates an exemplary key list 700 that is encrypted using current key 709. The key list may comprise a plurality of previous keys 701-704 which may be used as necessary for decryption, encryption, re-keying, and so forth on those files 707 and 708 that are encrypted using previous keys 701-704.

FIG. 7 illustrates an exemplary key list 700 that is encrypted using second key 709. Second key 709 may also be referred to as the current key, because second key 709 is presumably the key that is presently used by an EFS system to encrypt files, or, as described above, FEKs. The key list 700 may comprise a plurality of previous keys 701-704 which may be used as necessary for decryption, encryption, re-keying, and so forth on those files 707 and 708 that are encrypted using previous keys 701-704. Thus the key 700 list allows access to files 707, 708 encrypted using previous cryptographic keys 701-704 through validation of possession of a current or updated cryptographic key 709.

The format of a key in the key list may be as follows:
<sizeof(keydata), keydata>

It is important to note that other data can be stored in this key list structure and this is an exemplary implementation only.

FIG. 7 reflects this format by providing the size of key data column 705, where 701a is the size of first key 701, 702a is the size of previous key 702, 703a is the size of previous key 703, and 704a is the size of previous key 704. The size field, e.g., 701a acts as an integrity check. The use of such a field helps ensure that a corrupt key is not used to encrypt files. The encryption type of the key list 700 may be stored in a user profile or registry, at the same location, e.g.:

EFS\CurrentKeys\MasterKeyHistory\EncryptionKeyType.
Possible values of such a key may be, e.g.:
EFS_KEY_TYPE_RSAKEY (0x00000001), EFS_KEY_TYPE_MASTERKEY (0x00000002)

Thus, an exemplary registry structure under an EFS may be as follows:

---

HKCU\Software\Microsoft\Windows NT\CurrentVersion\EFS
    CurrentKeys
        Certificate Hash (= Current Key)
        Master Key History
            Encryption Key Type (RSA or MasterKey)
            Encryption Key Hash
            $Hash_1$: Encrypted [sizeof($keydata_1$),
                $keydata_1 = E_{currentKey}$\{old smart card master key 1\}]
            $Hash_2$: Encrypted [sizeof($keydata_2$),
                $keydata_2 = E_{currentKey}$\{old smart card master key 2\}]
            ....
            $Hash_n$: Encrypted [sizeof($keydata_n$),
                $keydata_n = E_{currentKey}$\{old smart card master key n\}]

---

In embodiments where the key list 700 provided herein is used with an EFS, and where there is no current key 709, then when a new current key is installed, the key corresponding to EncryptionKeyHash may be added as a new entry into the key list 700. Such embodiments handle the case where the current key 709 is deleted by mistake by the user.

Previous keys 701-704, e.g., previous master keys, may be routinely encrypted to a current key 709. In this regard, they may be encrypted using an RSA-key if a software-based key is the current key 709 or a master key may be used if a smartcard is the current key 709.

Thus, a first key, 701, may originally be a current key for the encryption of files, such as in an EFS system, and the current key may be changed to the second key 709. A key may be changed for any number of reasons. It may be changed for security reasons, or simply because a card, such as a smart card, that allowed access to a first key 701 was lost. In some implementations, if a smartcard is used to encrypt the key history, and this card is lost, then the entire key list 700 is lost, and files 707, 708 may have to be recovered using a data recovery agent. Another implementation could also encrypt the key list 700 using a data recovery agent.

The change may also occur because an EFS policy changes the use of a first key 701, which may be for example, an RSA key, to the use of a second key, a master key, and vice-versa. The process for changing from a first encryption key 701 as current key to a second key 709 as current key can proceed as follows:

The key list is first decrypted using the first key 701
The key list is next re-encrypted using the second key 702
The first key 701, e.g., a master key derived from a smartcard, is encrypted to the second key 709 and added to the list 700 in the registry.

Figure 8:
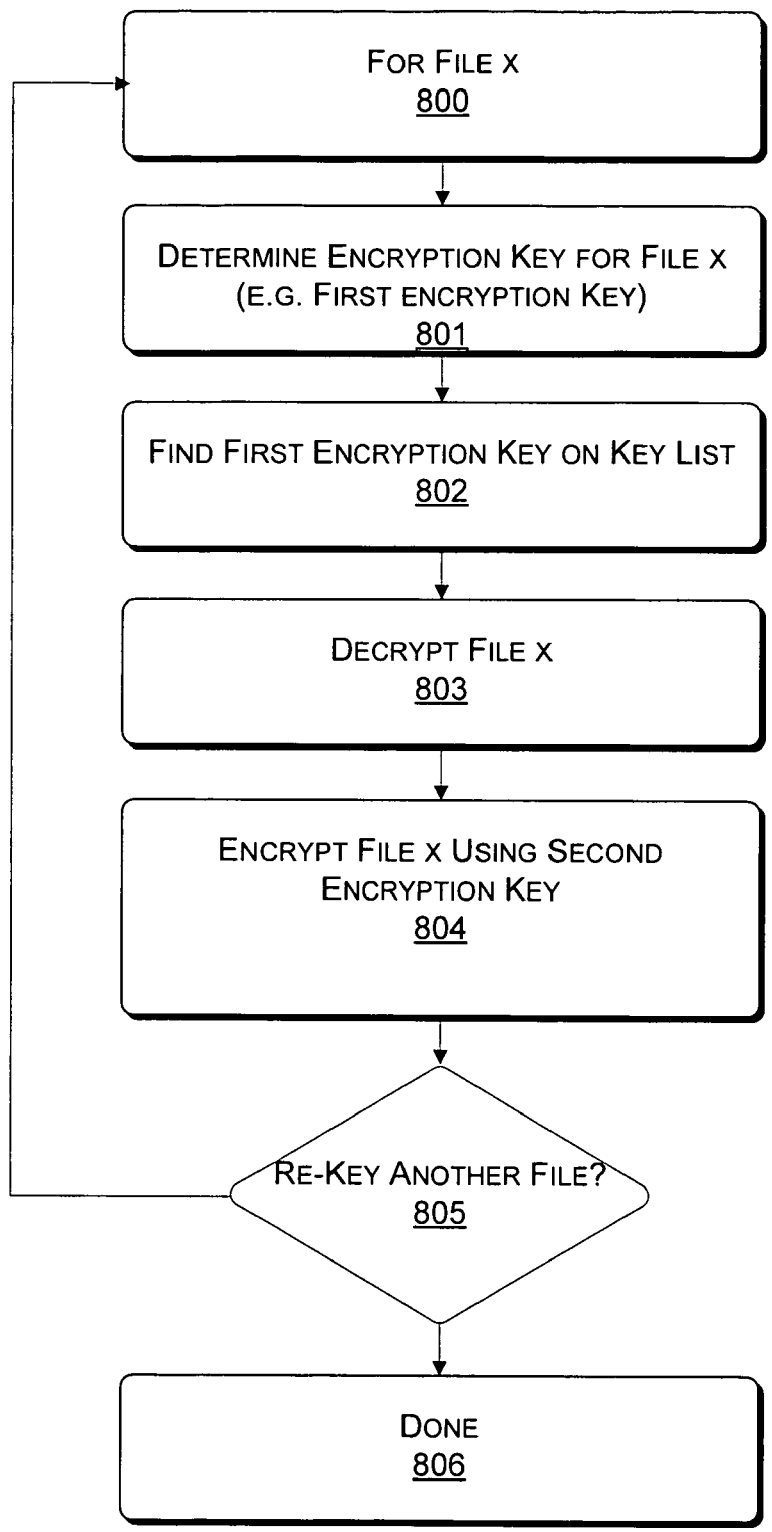
FIG. 8 illustrates an exemplary process for re-keying, also referred to as re-encrypting, files. A process such as that of FIG. 8 may be implemented to operate over time as computing resources are available to provide a seamless user experience without the need to wait for a lengthy re-key of all files.

In addition, the following steps may be performed in some scenarios:

If the second key 709 was a software key, then the key list 700 may be beneficially encrypted using a direct RSA method If the second key 709 was a smart card key, then the key list 700 may be beneficially encrypted using a master key method FIG. 8 illustrates an exemplary process for re-keying, also referred to as re-encrypting, files. A process such as that of FIG. 8 may be implemented to operate over time as computing resources are available to provide a seamless user experience without the need to wait for a lengthy re-key of all files.

It is a mechanism used to facilitate the ability to re-key all files over time. The process of FIG. 8 may simplify the re-keying of files, especially where one or more smartcards are used and where many files may need to be updated and cannot be completed all in the same process or session. It is also important to note that the use of the key list for access to previously encrypted files does not mandate re-key of files encrypted using a previous key, but merely facilitates this effort for ease of management.

Thus, in FIG. 8, a first file x may be taken 800 and a determination of a key used to encrypt file x may be made 801. This determination may be facilitated by a pointer stored with the file that points to the appropriate encryption key. Next, the needed key, e.g., the first key, can be retrieved from the key list 802, and used to decrypt file x 803. File x may then be encrypted using the current key, e.g., the second key, in step 804. If sufficient computing resources are available to re-key another file, the determination can be made to do so 805. Otherwise, the process may idle 806 or finish until such resources are available. Rekeying files over time in this way allows for re-key in the background that does not require user intervention or user waiting for decryption/encryption processes. Files that are not yet re-keyed may be accessed simply by going to the key list and retrieving an appropriate previous key to decrypt, or by decrypting with the current key.

Figure 9:
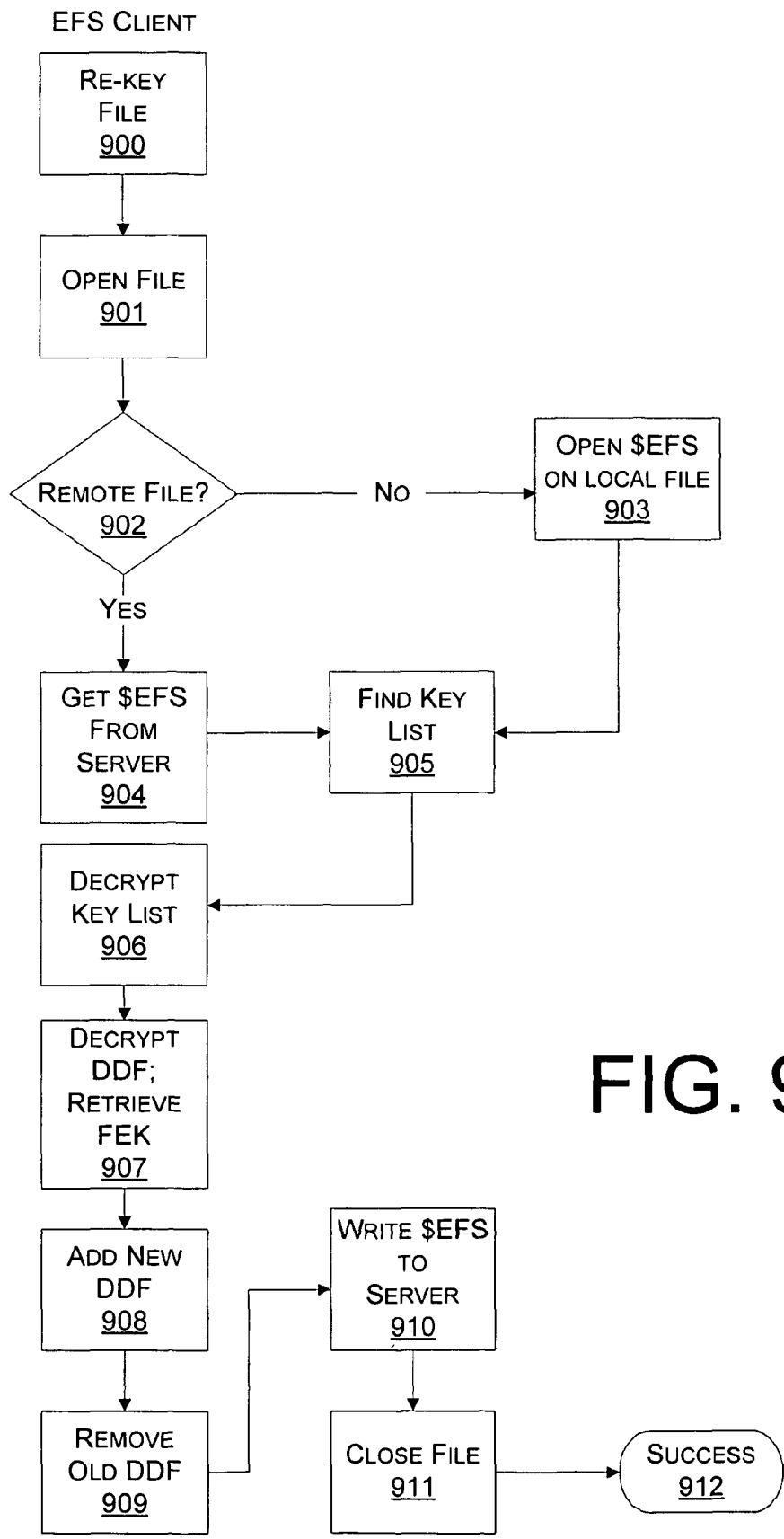
FIG. 9 provides more detailed embodiments of the process illustrated in FIG. 8.

FIG. 9 provides more detailed embodiments of the process illustrated in FIG. 8. FIG. 9 is directed more particularly to those embodiments of the invention that use an EFS to encrypt files. As illustrated in FIG. 9, an EFS client may start a re-key file process 900. The file may be opened 901. A determination may be made as to whether the file is a remote file 902. If the file is local, an EFS process for accessing the local file 903 may be started. If the file is remote, an appropriate EFS reference and process can be started to interact with the server where the file resides in order to download the encrypted file to the EFS client. In either case, the key list can be retrieved 905.

The key list may be decrypted using, for example, a current EFS master key 906. In a MICROSOFT® style EFS, the key may be used to decrypt the DDF and retrieve the FEK 907. A new DDF may be added to the file 908. The old DDF may be removed from the file 909. The pointer to the appropriate key for the file may be updated, along with any other updates needed for consistency in the particular EFS system 910. Finally, the file may be closed 911. The file is now successfully re-keyed 912. One benefit of the invention that will be clear to those of skill in the art from FIG. 9 is the ability to easily migrate files on remote servers without exposing the files in the clear or requiring admin intervention on the server or requiring migration of the keys used on the server to the client.

Figure 10:
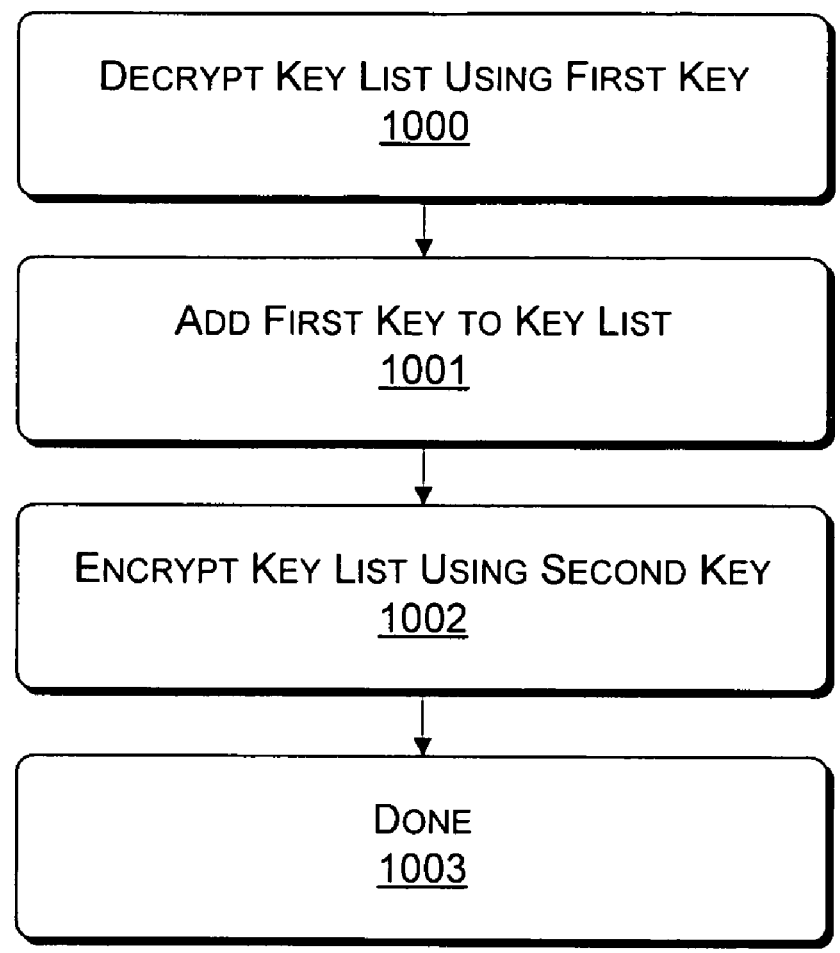
FIG. 10 illustrates a process for changing current keys used in an EFS. The previously used key (first key) can be used to decrypt the key list. The previous key may then be added to the list, and the list can be encrypted using the new current key. The previous key will be available in the list for any files that are encrypted using the previous key, and only those with access to the current key will have access to the previous key.

FIG. 10 illustrates a process for changing current keys used in an EFS. The previously used key (first key) can be used to decrypt the key list 1000. The previous key may then be added to the list 1001, and the list can be encrypted using the new current key 1002. While additional steps may be undertaken, the list update process can comprise these three steps. The previous key will be available in the list for any files that are encrypted using the previous key, and only those with access to the current key will have access to the previous key. This process is also explained with reference to FIG. 7.

As stated with reference to FIG. 7, embodiments of the invention may provide a key list that is integrated into an EFS system. In such embodiments, where there is no current key and a new current key is installed, a key corresponding to EncryptionKeyHash may be added as a new entry into the key list in step 1001. Such embodiments may be beneficial, for example, to handle situations where a current key is deleted.

Figure 11:
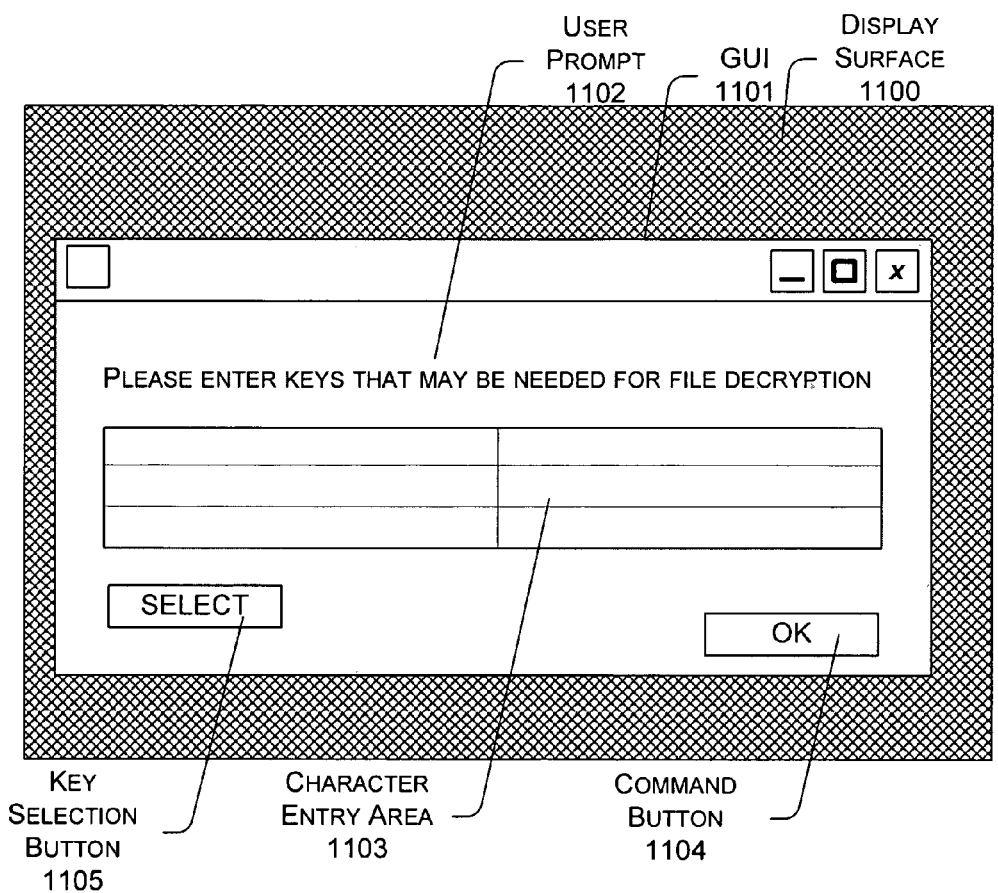
FIG. 11 illustrates an exemplary Graphical User Interface (GUI) for a re-key wizard. Such a wizard may prompt a user to enter all previous keys, as well as a current key and/or any new keys that may be needed to access files in an EFS.

The process of FIG. 10 may be routinely performed to add any previous keys to a key list, or may be performed on an as-needed basis depending on which keys are considered useful and necessary. Whenever a first key is used by an EFS to encrypt user files, or, for that matter, DDFs, and the first key is changed to a second key, it may be beneficial to store the first key in a key list through a process such as that of FIG. 10. As stated above, a key may be changed for any number of reasons, including but not limited to EFS policy changes regarding use of a first key, which may be for example, an RSA key, to the use of a second key, a master key, and vice-versa. The process for changing from a first encryption key 701 as current key to a second key 709 as current key can proceed as follows:

Note that, as stated with reference to FIG. 7, if the second key is a software key, then the key list may be beneficially encrypted in step 1002 using a direct RSA method. If the second key was a smart card key, then the key list may be beneficially encrypted in step 1002 using a master key method FIG. 11 illustrates an exemplary Graphical User Interface (GUI) for a re-key wizard. Such a wizard may prompt a user to enter all previous keys that may be needed to access files in an EFS. The wizard of FIG. 11 may be supported by a process that can update the key list provided in FIG. 7. Providing a wizard allows for retrieval of keys in a less-than fully automated way, and is useful because it allows for user input into the process. The GUI 1101 is presented on a display surface 1100. Elements of the GUI 1101 of FIG. 11 can be, for example, a user prompt 1102 directing the user to enter previously used keys, a character entry area 1103 for entering decryption keys, a selection button 1105 for automatically entering keys, and a command button 1104 to indicate that the user is done entering information and that the key information may be loaded into a key list, or other storage location where the entered keys can be automatically used to re-key and/or otherwise access files.

Figure 12:
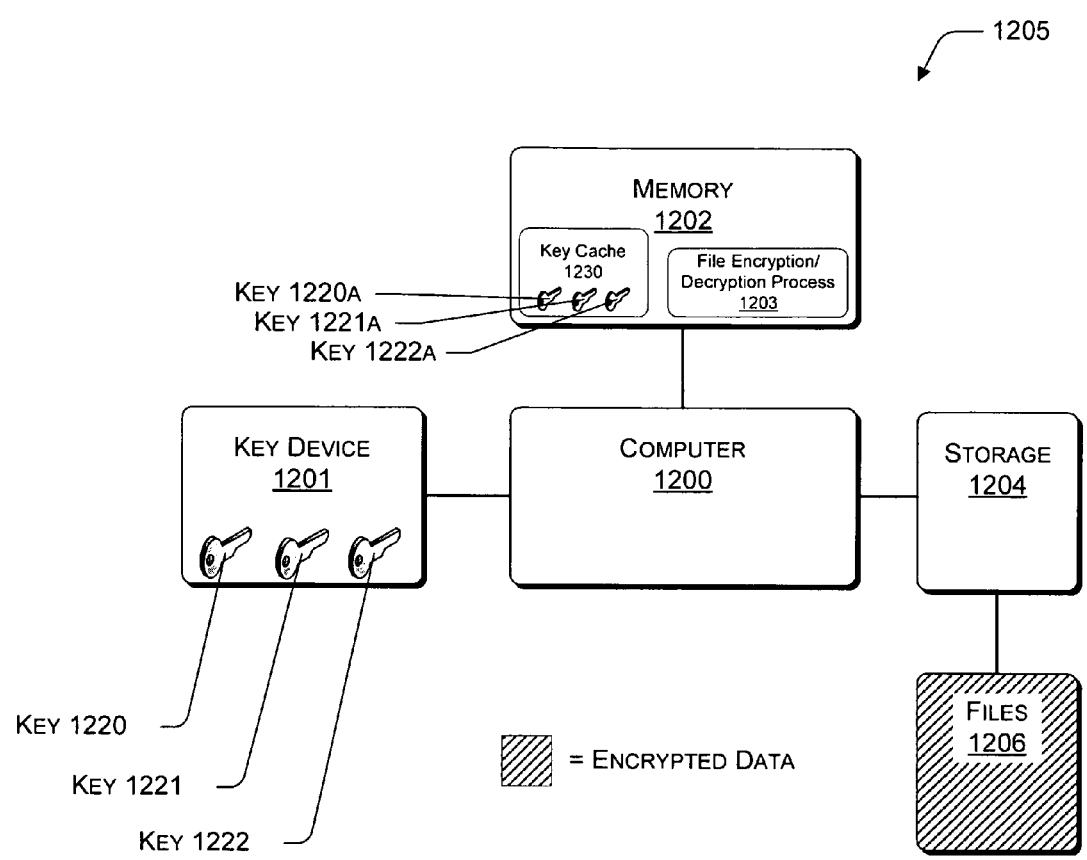
FIG. 12 illustrates an arrangement whereby keys 1220-1222 that may not be on the key list of FIG. 7 can be introduced to the computer 1200 via, for example, the key device 1201, and temporarily cached for use by the EFS. Such keys may be scrubbed from memory when the user logs off to prevent unauthorized use.

FIG. 12 illustrates an arrangement whereby keys 1220-1222 that may not be on the key list of FIG. 7 can be introduced to the computer 1200 via, for example, the key device 1201, or the GUI of FIG. 11, and temporarily cached in key cache 1230 for use by an EFS 1205. Such keys 1220-1222 may be scrubbed from memory 1202 when the user logs off, to prevent unauthorized use.

A typical scenario that may trigger the use of a cache 1230 such as that illustrated in FIG. 12 is where a user has multiple keys stored on multiple smart cards. For one reason or another, it may be difficult or impossible to obtain the keys from a source such as the key list of FIG. 7. In such a setting, a first smart card bearing key 1220, a second smart card bearing key 1221, and a third smart card bearing key 1222 may be inserted into key device 1201, for example, a smart card reader that is operably connected to computer 1200. Each time a card bearing a key is inserted, the computer 1200 may cache the key in key cache 1230. Keys 1220A, 1221A, and 1222A are, for example, cached versions of keys 1220, 1221, and 1222, respectively. File encryption and decryption process 1203 may then use cached keys 1220-1222 to decrypt and/or encrypt files 1206 stored in any hypothetical storage location 1204 as necessary. Files 1206 may also be re-keyed into a current key to avoid the necessity of future caching operations.

Referring briefly to storage 1204 and related elements such as 604, 54, and 34 from previous Figures, it should be noted that a computing device typically includes at least some form of computer readable media. Computer readable media can be any available media that can be accessed by a computer such as 30, 50, 600, and 1200. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a computer such as 30, 50, 600, and 1200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A processor-implemented method for managing multiple keys for file encryption and decryption, the method comprising:

providing, via the processor, a key list for maintaining key history;

storing in the key list, a first key useable for decrypting a first file;

encrypting the key list with a second key useable for decrypting a second file that is different than the first file, the second key being different from the first key;

executing a first re-keying operation comprising:
decrypting the key list with the second key;
retrieving the first key from the key list;
decrypting the first file using the first key; and
encrypting the first file using a third key, the third key being used as a current key for file encryption and being different from the first key and the second key;

executing a second re-keying operation comprising:
retrieving the second key; decrypting the second file using the second key; and
encrypting the second file using the third key;
storing the second key in the key list; and
encrypting the key list with the third key, the third key useable thereafter for decrypting the first file, the second file, and the key list.

2. The method of claim 1, wherein executing a first re-keying operation further comprises determining the encryption key used for encrypting the first file as the second key, wherein said determining comprises checking a pointer associated with said first file.

3. The method of claim 1, further comprising prompting a person to enter at least one key, and adding said at least one key to the key list.

4. The method of claim 1, wherein the key list is stored with a user profile.

5. The method of claim 1, wherein the third key is stored on a portable device.

6. The method of claim 1, further comprising:
storing a fourth key that is not available in said key list, in a cache memory;
using the fourth key for at least one of a) encrypting a third file or b) decrypting the third file; and
deleting the fourth key from the cache memory upon logout.

7. The method of claim 1, wherein the re-keying operation is a background re-keying operation that is carried out over a period of time subject to availability of computing resources thereby reducing impact upon current usage of the computing resources.

8. A storage medium, the storage medium not being a transient signal, the storage medium having stored thereon instructions for managing multiple keys for file encryption and decryption, the instructions, when executed performing acts of:

providing a key list for maintaining key history;
storing in the key list, a first key useable for decrypting a first file;
encrypting the key list with a second key useable for decrypting a second file that is different than the first file, the second key being different from the first key;
executing a first re-keying operation comprising:
decrypting the key list with the second key;
retrieving the first key from the key list;
decrypting the first file using the first key; and encrypting the first file using a third key, the third key being used as a current key for file encryption and being different from the first key and the second key;
executing a second re-keying operation comprising:
retrieving the second key; decrypting the second file using the second key; and
encrypting the second file using the third key;
storing the second key in the key list; and
encrypting the key list with the third key, the third key useable thereafter for decrypting the first file, the second file, and the key list.

9. The storage medium of claim 8, list wherein the re-keying operation is a background re-keying operation that is carried out over a period of time subject to availability of computing resources thereby reducing impact upon current usage of the computing resources.

10. The storage medium of claim 8, further comprising instructions for prompting a person to indicate at least one additional key, and instructions for adding said at least one additional key to the new key list.

11. The storage medium of claim 8, wherein the new key list is stored with a user profile.

12. The storage medium of claim 8, wherein the third key is stored on a portable device.

13. The storage medium of claim 8, further comprising instructions for storing an additional key that is not available in said current key list, in a cache memory.

14. The storage medium of claim 8, wherein executing a first re-keying operation further comprises determining the encryption key used for encrypting the first file as the second key, wherein said determining comprises checking a pointer associated with said first file.

15. The storage medium of claim 8, wherein the instructions, when executed, further prompting a person to enter at least one key, and adding said at least one key to the key list.

16. A hardware computing device configured to:
provide a key list for maintaining key history;
store in the key list, a first key useable for decrypting a first file;
encrypt the key list with a second key useable for decrypting a second file that is different than the first file, the second key being different from the first key;
execute a first re-keying operation comprising:
decrypt the key list with the second key;
retrieve the first key from the key list;
decrypt the first file using the first key; and
encrypt the first file using a third key, the third key being used as a current key for file encryption and being different from the first key and the second key;
execute a second re-keying operation comprising:
retrieve the second key; decrypting the second file using the second key; and
encrypt the second file using the third key;
store the second key in the key list; and
encrypt the key list with the third key, the third key useable thereafter for decrypting the first file, the second file, and the key list.

17. The computing device of claim 16, wherein the re-keying operation is a background re-keying operation that is carried out over a period of time subject to availability of computing resources thereby reducing impact upon current usage of the computing resources.

18. The computing device of claim 16, wherein executing a first re-keying operation further comprises determining the encryption key used for encrypting the first file as the second key, wherein said determining comprises checking a pointer associated with said first file.

* * * * *